United States Patent
Wong et al.

(10) Patent No.: US 11,008,878 B2
(45) Date of Patent: May 18, 2021

(54) TURBINE BLADE WITH CERAMIC MATRIX COMPOSITE AEROFOIL AND METALLIC ROOT

(71) Applicant: Rolls-Royce plc, London (GB)

(72) Inventors: Alexander Wong, London (GB); Michael J. Whittle, London (GB); Anthony Razzell, London (GB)

(73) Assignee: Rolls-Royce plc

( * ) Notice: Subject to any disclaimer, the term of this patent is extended or adjusted under 35 U.S.C. 154(b) by 139 days.

(21) Appl. No.: 16/229,274

(22) Filed: Dec. 21, 2018

(65) Prior Publication Data

US 2020/0200020 A1 Jun. 25, 2020

(51) Int. Cl.
| | | |
|---|---|---|
| *F01D 5/30* | (2006.01) | |
| *F01D 5/28* | (2006.01) | |
| *F01D 5/18* | (2006.01) | |
| *F01D 5/20* | (2006.01) | |

(52) U.S. Cl.
CPC .......... *F01D 5/3084* (2013.01); *F01D 5/187* (2013.01); *F01D 5/282* (2013.01); *F01D 5/20* (2013.01); *F01D 5/3007* (2013.01); *F05D 2240/307* (2013.01); *F05D 2240/80* (2013.01); *F05D 2260/30* (2013.01); *F05D 2300/6033* (2013.01)

(58) Field of Classification Search
CPC .......... F01D 5/3084; F01D 5/147; F01D 5/18; F01D 5/188; F01D 5/30; F01D 11/008; F01D 11/08; F01D 5/187; F01D 5/189; F01D 5/282; F01D 5/284; F01D 5/20; F01D 5/3007; F01D 9/065; F01D 5/081; F01D 25/28; F05D 2240/307; F05D 2240/80; F05D 2260/30; F05D 2300/6033; F05D 2230/642; Y10Y 29/49339

See application file for complete search history.

(56) References Cited

U.S. PATENT DOCUMENTS

| | | |
|---|---|---|
| 6,224,339 B1 | 5/2001 | Rhodes et al. |
| 6,514,046 B1 | 2/2003 | Morrison et al. |
| 7,080,971 B2 * | 7/2006 | Wilson .............. F01D 5/147 416/92 |
| 7,670,116 B1 | 3/2010 | Wilson, Jr. et al. |
| 7,824,150 B1 | 11/2010 | Kimmel et al. |
| 7,828,515 B1 | 11/2010 | Kimmel |
| 8,015,705 B2 | 9/2011 | Wilson, Jr. et al. |
| 8,142,163 B1 | 3/2012 | Davies |
| 8,475,132 B2 | 7/2013 | Zhang et al. |
| 9,506,350 B1 | 11/2016 | Memmen |
| 9,938,838 B2 * | 4/2018 | Witz .............. F01D 5/3084 |
| 2010/0247329 A1 | 9/2010 | Morgan et al. |
| 2014/0234088 A1 | 8/2014 | Brandl |

FOREIGN PATENT DOCUMENTS

GB 2027496 A * 8/1979 ............... F01D 5/30

* cited by examiner

*Primary Examiner* — J. Todd Newton
*Assistant Examiner* — Eric J Zamora Alvarez
(74) *Attorney, Agent, or Firm* — Barnes & Thornburg LLP (57) ABSTRACT

A turbine blade for a gas turbine engine includes a root and an aerofoil. The root is configured to be coupled with a disc of the gas turbine engine and rotate with the disc about an axis during operation of the gas turbine engine. The aerofoil is coupled with the root of the turbine blade for movement with the root.

17 Claims, 7 Drawing Sheets

TURBINE BLADE WITH CERAMIC MATRIX COMPOSITE AEROFOIL AND METALLIC ROOT

FIELD OF THE DISCLOSURE

The present disclosure relates generally to gas turbine engines, and more specifically to turbine blades for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disc that supports the blades in a gas path of the engine. Supporting and retaining the blades to the disc, for example, may present design challenges.

SUMMARY

The present disclosure may comprise one or more of the following features and combinations thereof.

A turbine blade for a gas turbine engine may include a metallic root and a ceramic matrix composite aerofoil. The metallic root may include an attachment feature and a spigot. The attachment feature is adapted to couple the turbine blade with a disc for rotation about an axis. The spigot extends radially away from the attachment feature relative to the axis between a first end and a second end of the spigot.

The ceramic matrix composite aerofoil may be adapted to interact with gases during use of the turbine blade. The ceramic matrix composite aerofoil may include an outer wall and a retainer wall. The outer wall may define an interior region that receives the spigot of the metallic root. The retainer wall may extend away from the outer wall into the interior region. The retainer wall may be coupled with the second end of the spigot to define a compression region of the outer wall located radially between a radial innermost end of the outer wall and the retainer wall and a tension region located radially between the retainer wall and a radial outermost end of the outer wall that defines a tip of the turbine blade such that the tension region extends radially beyond the second end of the spigot and is cantilevered from the second end of the spigot.

The retainer wall may be spaced apart radially from the radial outermost end of the outer wall by a predetermined distance. The predetermined distance is selected to cause a first portion of radial force loads acting on the outer wall during rotation of the turbine blade to be applied as tension to the tension region of the outer wall and a second portion of the radial force loads acting on the outer wall to be applied as compression to the compression region of the outer wall so that a magnitude of the radial force loads applied as compression during use of the turbine blade to the outer wall is reduced.

In some embodiments, the spigot may be tapered continuously from the first end to the second end. In some embodiments, the turbine blade may include a fastener. The fastener may extend radially through the retainer wall and into the second end of the spigot to couple the retainer wall with the spigot for movement therewith.

In some embodiments, the metallic root may be formed to define a first cooling passage that extends radially through the attachment feature and the spigot. The fastener may be formed to define a second cooling passage that extends radially through the fastener. The first cooling passage may be in fluid communication with the second cooling passage to allow cooling fluid to flow through the metallic root and the fastener into the interior region.

In some embodiments, the ceramic matrix composite aerofoil may include a cap coupled with the outer wall. The cap may be located radially outward of the retainer wall. In some embodiments, the cap may be spaced apart radially inwardly from the radial outermost end of the outer wall of the ceramic matrix composite aerofoil.

In some embodiments, the cap may be formed to include a through hole that extends radially through the cap to allow fluid located in the interior region to exit the turbine blade through the cap. The through hole may be angled toward a trailing edge of the turbine blade.

In some embodiments, the turbine blade may include a rocker system. The rocker system may include a fastener, a rocker, and a mass. The fastener may extend radially through the retainer wall and into the second end of the spigot. The rocker may be located radially between the fastener and the retainer wall. At least a portion of the mass may be located radially between the rocker and the retainer wall and configured to apply a radially outward force to the rocker during rotation of the turbine blade about the axis.

In some embodiments, the spigot is formed to define a recess that extends into the spigot. The turbine blade may include a rocker located in the recess of the spigot. The rocker may engage the ceramic matrix composite aerofoil to apply a radial inward load to the aerofoil during use of the turbine blade.

According to another aspect of the present disclosure, a turbine blade for a gas turbine engine may include a root and an aerofoil. The root may include an attachment feature and a spigot that extends radially away from the attachment feature relative to an axis between a first end and a second end of the spigot. The aerofoil may be arranged around the spigot to define an interior region that receives the spigot. The aerofoil may be coupled with the spigot such that a portion of the aerofoil extends radially outward away from the second end of the spigot and is cantilevered from the second end of the spigot.

In some embodiments, the aerofoil may include a radially extending outer wall that defines the interior region and a retainer wall that extends away from the outer wall into the interior region. The retainer wall may be coupled with the second end of the spigot for movement therewith.

In some embodiments, the turbine blade includes a fastener that extends radially through the retainer wall and into the second end of the spigot. The fastener may be coupled with the spigot to couple the retainer wall with the spigot for movement with the spigot.

In some embodiments, the attachment feature, the spigot, and the fastener may be formed define fluidly connected passages. The fluidly connected passages may be configured to conduct fluid through the root and into the interior region of the aerofoil.

In some embodiments, the aerofoil has a radial inner end located adjacent the attachment feature of the root and a radial outer end spaced apart radially from the radial inner end. The turbine blade may include a cap received in the interior region and coupled to an interior surface of the aerofoil at the radial outer end of the aerofoil.

In some embodiments, the cap may be formed to include a cooling hole that extends radially through the cap. The cooling hole may provide fluid communication between the interior region and an environment outside of and around the turbine blade.

In some embodiments, the aerofoil may include a radially extending outer wall that defines the interior region and a retainer wall that extends away from the outer wall into the interior region.

In some embodiments, the turbine blade may include a rocker system that includes a fastener, a rocker, and a mass. The fastener may extend radially through the retainer wall and into the second end of the spigot. The rocker may be located radially between the fastener and the retainer wall. At least a portion of the mass may be located radially between the rocker and the retainer wall.

In some embodiments, the spigot may be formed to define a recess that extends circumferentially into the spigot. The turbine blade may include a rocker located in the recess. The rocker may engage the aerofoil.

In some embodiments, the rocker may include a body and a lever arm. The body may be located in the recess and having a curvilinear surface that engages the spigot in the recess. The lever arm may extend away from the body and engage the aerofoil.

In some embodiments, the spigot may taper continuously from the first end to the second end of the spigot. In some embodiments, the aerofoil may continuously between a radial innermost end of the aerofoil located adjacent the attachment feature of the root and a radial outermost end that defines a tip of the turbine blade.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
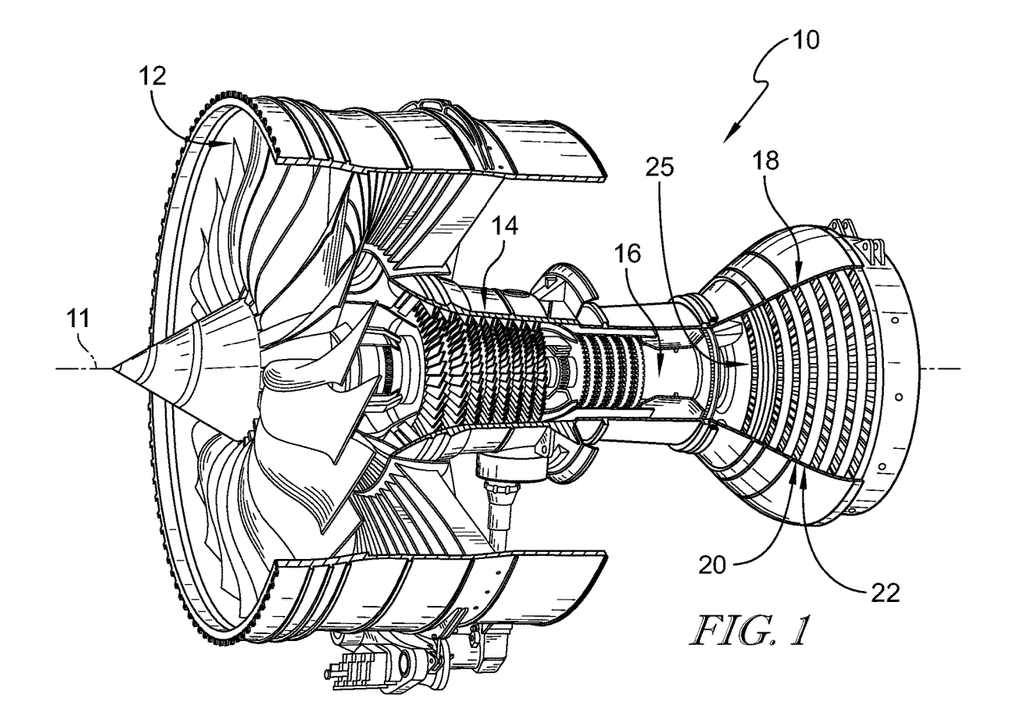
FIG. 1 is a cutaway view of a gas turbine engine that includes a fan, a compressor, a combustor, and a turbine having a plurality of turbine blades in accordance with the present disclosure that are adapted to extract work from hot combustion products received from the combustor.
Figure 2:
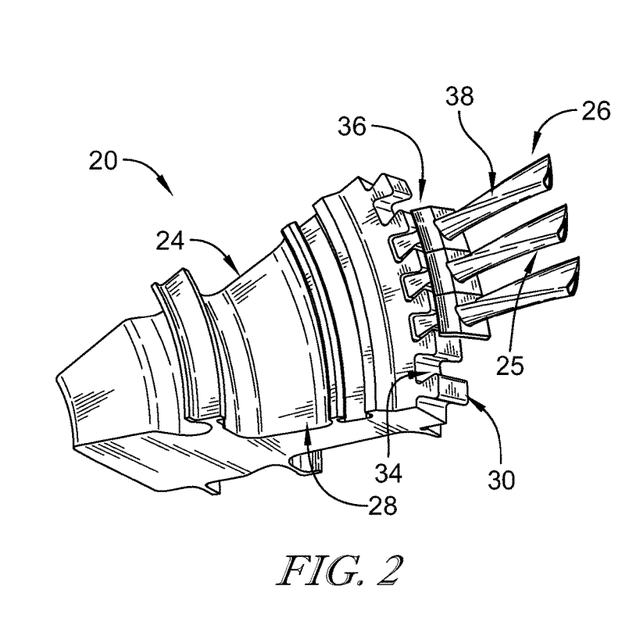
FIG. 2 is a perspective view of a portion of a turbine wheel included in the turbine of the gas turbine engine of FIG. 1 showing that the turbine wheel includes a disc and a plurality of turbine blades coupled with the disc for rotation about an axis of the engine during operation of the engine.
Figure 3:
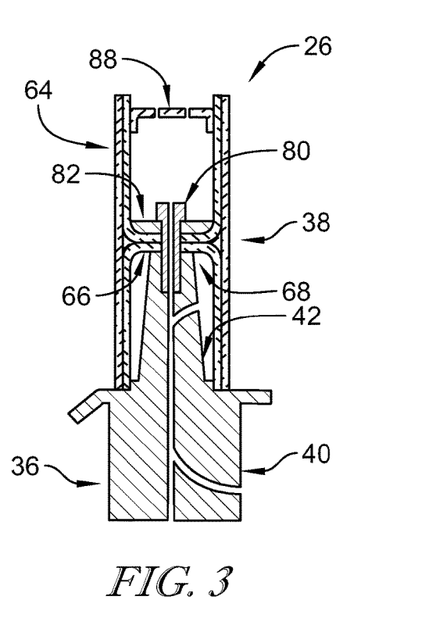
FIG. 3 is a diagrammatic and section view of one of the turbine blades of FIG. 2 showing that the turbine blade includes a metallic root and a ceramic matrix composite aerofoil coupled with the metallic root and suggesting that a portion of the ceramic matrix composite aerofoil is cantilevered from the metallic root so that a portion of the aerofoil is in tension during use of the turbine blade.

A turbine blade 26 in accordance with the present disclosure is adapted for use with a gas turbine engine 10 as suggested in FIGS. 1-3. The gas turbine engine 10 includes a fan 12, a compressor 14, a combustor 16, and a turbine 18 as shown in FIG. 1. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as suggested in FIG. 1. A portion of one of the turbine wheel assemblies 20 is shown in FIG. 2. Each turbine wheel assembly 20 is configured to interact with the hot combustion gases from the combustor 16 and rotate about the axis 11 of the gas turbine engine 10 to generate power for driving the compressor 14 and the fan 12. A turbine vane assembly 22 is located between neighboring turbine wheel assemblies 20 to direct gases received from an upstream turbine wheel assembly 20 toward a downstream turbine wheel assembly 20.

The turbine wheel assembly 20 shown in FIG. 2 includes a disc 24 and a plurality of blades 26 coupled with the disc 24. The disc 24 is coupled to a shaft of the gas turbine engine 10 and is adapted to rotate about the axis 11. The blades 26 are arranged circumferentially about the axis 11 and are coupled with the disc 24 for rotation therewith during use of the gas turbine engine 10.

The disc 24 includes a body 28 and plurality of disc posts 30 that extend radially outward from the body 28 as shown in FIG. 2 to define blade-receiver slots 34. In the illustrative embodiment, the blade-receiver slots 34 are dovetail shaped. In other embodiments, the blade-receiver slots are fir-tree shaped or any other suitable shape. In yet other embodiments, the disc 24 may be formed to include a circumferentially extending slot to receive the blades 26. The disc is metallic in the illustrative embodiment.

Figure 4:
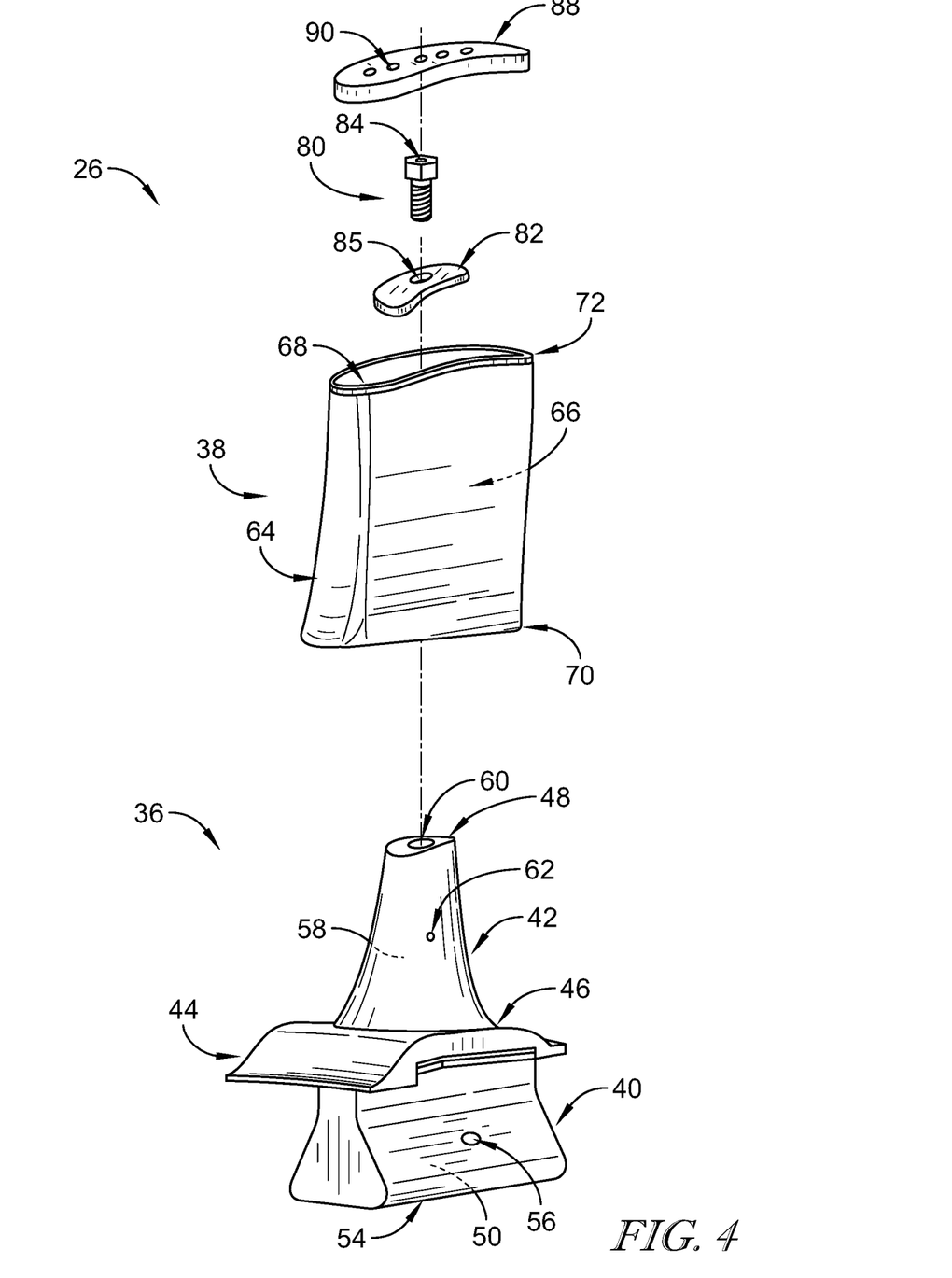
FIG. 4 is an exploded view of the turbine blade of FIG. 3 showing that the turbine blade includes the metallic root having an attachment feature and a spigot that extends away from the attachment feature, the ceramic matrix composite aerofoil adapted to receive the spigot and including a sole plate and an outer cap, and a fastener configured to couple the ceramic matrix composite aerofoil with the metallic root.
Figure 5:
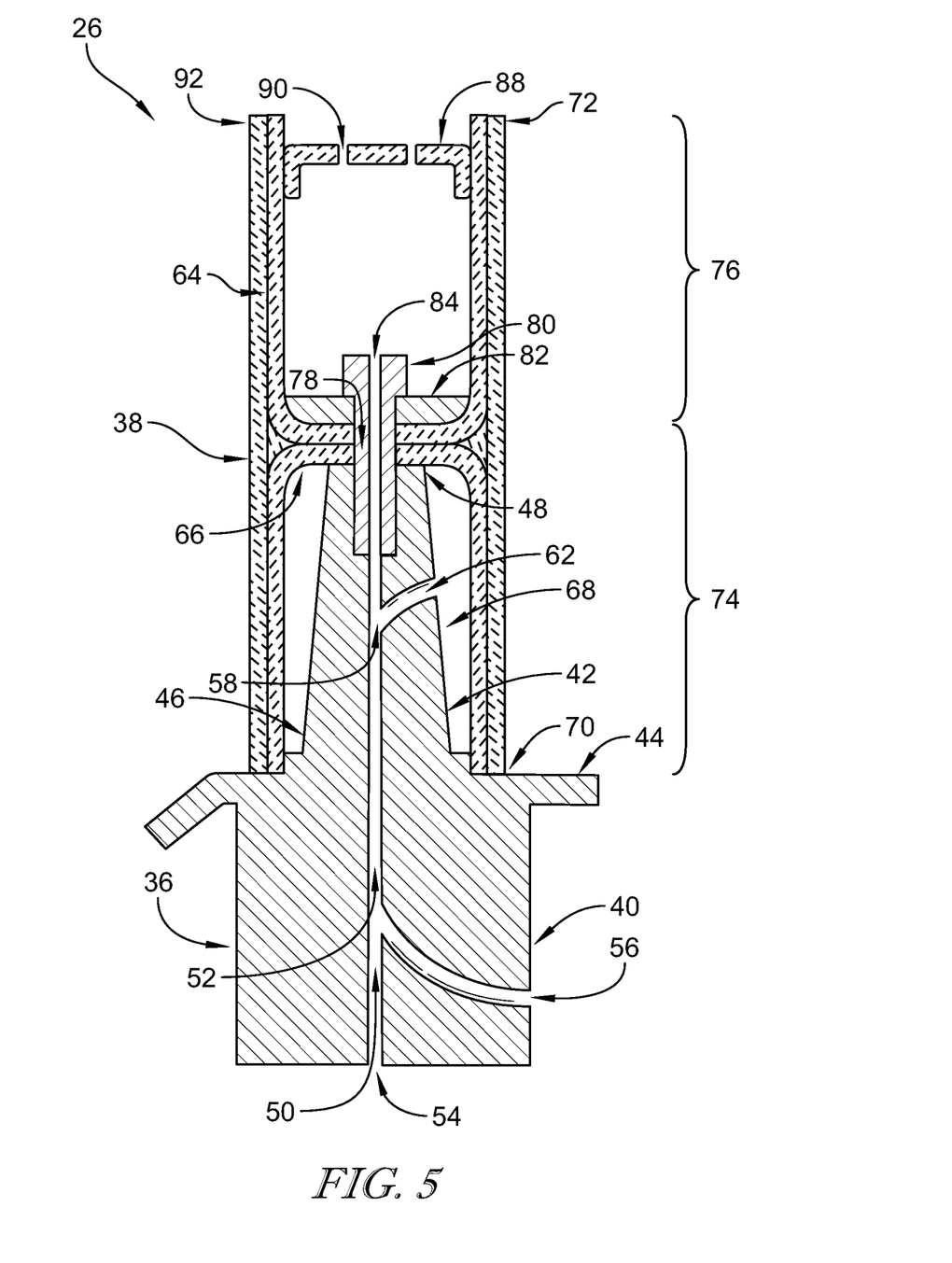
FIG. 5 is a diagrammatic and section view of one of the turbine blades of FIG. 2 showing that the metallic root includes an attachment feature and a spigot that extends away from the spigot and the aerofoil includes an outer wall arranged around the spigot and a retainer wall that extends into an interior region of the aerofoil and is coupled with the spigot so that a portion of the outer wall is cantilevered from the spigot.

Each blade 26 includes a root 36 and an aerofoil 38 that extends radially away from the root 36 relative to the axis 11 as shown in FIGS. 3-5. The root 36 of each blade 26 is received in a corresponding one of the slots 34 to couple the blade 26 to the disc 24 for rotation with the disc 24. The aerofoils 38 are shaped to be pushed circumferentially by the hot gases moving in the flow path 25 to cause the turbine wheel assembly 20 to rotate about the axis 11 during operation of the gas turbine engine 10.

The root 36 of each blade 26 includes an attachment feature 40 and a spigot 42 as shown in FIG. 4. The attachment feature 40 is shaped to be received in one of the blade-receiver slots 34 to couple the root 36 with the disc 24 for rotation therewith. The spigot 42 extends radially away from the attachment feature 40 and is coupled with the aerofoil 38 to couple the aerofoil 38 with the root 36 for movement with the root 36.

The illustrative attachment feature 40 is dovetail shaped when viewed axially relative to the axis 11. In other embodiments, the attachment feature 40 is dovetail shaped when viewed circumferentially relative to the axis 11. In other embodiments, the attachment feature 40 is firtree shaped when viewed axially or circumferentially relative to the axis 11. In yet other embodiments, the attachment feature 40 may have any suitable alternative shape for coupling the root 36 with the disc 24.

The spigot 42 includes an inner end 46 and an outer end 48 that is spaced apart radially from the inner end 46 of the spigot 42 as shown in FIG. 4. The spigot 42 extends radially between the inner end 46 and the outer end 48. The inner end 46 is coupled with the attachment feature 40 for movement therewith. The outer end 48 is cantilevered from the attachment feature 40. As discussed below, the outer end 48 is spaced apart radially from the inner end 46 by a predetermined distance to distribute force loads to the aerofoil 38 in both tension and compression within the tolerances of the aerofoil 38 and to reduce the centrifugal load applied to the inner end 46 of the spigot 42.

The spigot 42 tapers continuously from the inner end 46 to the outer end 48 in the illustrative embodiment. As a result, the spigot 42 has a smaller sectional area at the outer end 48 as compared to the inner end 46. The tapered spigot 42 results in less mass being located further radially from the axis 11 such that centrifugal loads applied to the spigot 42 are minimized relative to non-tapered spigots or spigots that flare outwardly at the outer end. The outer end 48 of the spigot 42 is formed without a flare as shown in FIGS. 4 and 5. In other embodiments, the outer end 48 of the spigot 42 may flare outward.

The root 36 further includes a platform 44 in the illustrative embodiment as shown in FIGS. 4 and 5. The platform 44 is coupled with the attachment feature 40 and is located radially outward of the attachment feature 40. The platform 44 extends axially fore and aft beyond the attachment feature 40 and the spigot 42. The platform 44 extends circumferentially in both directions beyond the attachment feature 40 and the spigot 42. The platform 44 defines an inner boundary of the flow path 25 and interacts with the hot gases and blocks radially inward movement of the gases toward the attachment feature 40 and the disc 24.

Illustratively, the root 36 comprises metallic materials. The root 36 may be entirely made of metallic materials. The root 36 comprises only metallic materials in the illustrative embodiment. In other embodiments, the root 36 may comprise one or more of ceramic matrix composite materials, composite materials, and metallic materials. In some embodiments, the root 36 includes an outer coating for thermal and/or environmental insulation. The attachment feature 40, the spigot 42, and the platform 44 are integrally formed in the illustrative embodiment. As a result, the root 36 is a single, one-piece, unitary component. In some embodiments, the platform 44 is omitted or formed as a separate component from the attachment feature 40 and the spigot 42. In some embodiments, the platform 44 is made of ceramic matrix composite material and separate from or integral with the aerofoil 38.

The root 36 is formed to include a cooling passageway 50 that extends radially through the root 36 to conduct cooling fluid through the blade 26 and/or to provide sealing to minimize ingestion of hot gases into an interior region 68 as suggested in FIGS. 4 and 5. The attachment feature 40 is formed to define a passage 52 that extends radially through the attachment feature as shown in FIGS. 4 and 5. Illustratively, the passage 52 includes a first inlet 54 that opens into a radially inner surface of the attachment feature 40 and a second inlet 56 that opens into a side surface of the attachment feature 40 as shown in FIG. 5. In some embodiments, the passage 52 includes first inlet 54, but not second inlet 56 if, for example, the air system favors feeding air from the radial inner side of the root 36. Such an embodiment may be used with a fir tree style attachment feature 40. In some embodiments, the passage 52 includes second inlet 56, but not first inlet 54.

The spigot 42 is formed to include a passage 58 that extends radially between the inner end 46 and the outer end 48 of the spigot and is fluidly coupled with the passage 52 formed in the attachment feature 40 to form a portion of the cooling passageway 50. The passage 58 includes an outlet 60 formed in the outer end 48 of the spigot 42 and an outlet 62 formed in a side surface of the spigot 42. In some embodiments, the spigot 42 includes a plurality of outlets 62 formed in the side surface to direct the cooling fluid toward the aerofoil 38.

The aerofoil 38 includes an outer wall 64 and a retainer wall 66 as shown in FIGS. 4 and 5. The outer wall 64 is arranged around the spigot 42 to interact with the gases in the flow path 25 and to insulate the spigot 42 from the gases. The outer wall 64 is formed to define an interior region 68 that receives the spigot 42. The retainer wall 66 is coupled with and extends away from the outer wall 64 into the interior region 68. The retainer wall 66 is coupled with the spigot 42 to couple the aerofoil 38 with the root 36.

Illustratively, the aerofoil 38 comprises ceramic matrix composite materials. The aerofoil 38 is made entirely and only of ceramic matrix composite materials in the illustrative embodiment. In other embodiments, the aerofoil 38 may comprise one or more of ceramic matrix composite materials, composite materials, and metallic materials. The outer wall 64 and the retainer wall 66 are integrally formed to provide a single, one-piece, unitary aerofoil 38.

Illustratively, the outer wall 64 and the retainer wall 66 are formed from plies of material. As shown in FIG. 5, the outer wall 64 includes an outer ply on the outer side and inner plys are arranged along the outer play and turn inward into the interior region to form the inner side of the outer wall 64 and form the retainer wall 66. Insert wedges are located between the inner and outer plys at the radial location of the retainer wall 66. In other embodiments, other plys or preforms are used to form the aerofoil 38. In some embodiments, the outer wall 64 and the retainer wall 66 are made of 3D woven preform which may improve through-thickness tensile and shear capability of the aerofoil 38.

The outer wall 64 extends between a radial inner end 70 and a radial outer end 72 that is spaced apart radially from the radial inner end 70 relative to the axis 11 as shown in FIGS. 4 and 5. The radial inner end 70 is an innermost end of the aerofoil 38 and the radial outer end 72 is an outermost end of the aerofoil 38 that defines a tip of the blade 26. The outer wall 64 extends continuously between the radial inner end 70 and the radial outer end 72. Illustratively, the radial inner end 70 of the outer wall 64 is in sliding contact with the root 36. In other embodiments, the radial inner end 70 is coupled with the attachment feature 40 and/or spigot 42 via a pin, brazing, bonding, a clamping member, or any other suitable alternative.

The interior region 68 extends radially through the aerofoil 38 to cause the aerofoil 38 to have an opening at the radial inner end 70 and the radial outer end 72 as shown in FIG. 4. The outer wall 64 is formed to define a leading edge, a trailing edge, a pressure side that extends axially between the leading edge and the trailing edge, and a suction side that extends axially between the leading edge and the trailing edge. Illustratively, the outer wall 64 of the aerofoil 38 is formed without holes. The outer wall 64 is solid and continuous. In some embodiments, the outer wall 64 is formed to include film cooling holes to allow coolant entering the vane through passage 52 to enter the gas path through the film cooling holes.

The retainer wall 66 is coupled with the outer end 48 of the spigot 42 to define a compression region 74 of the outer wall 64 and a tension region 76 of the outer wall 64 as shown in FIG. 5. Force loads acting on the aerofoil 38 due to centrifugal forces during use of the blade 26 are applied to the compression region 74 in compression and applied to the tension region 76 in tension.

Ceramic matrix composite materials may be stronger in compression than in tension. As such, some ceramic matrix composite aerofoils are designed to be completely in compression because of the strength of the material in compression. Therefore, some blades include a support strut that extends to the tip of the aerofoil or aerofoil segment and apply a clamping compression force to the entire aerofoil or aerofoil segment.

The aerofoil 38 of the present disclosure includes the compression region 74 and the tension region 76 so that a portion of the centrifugal force loads acting on the ceramic matrix composite aerofoil 38 are applied to the aerofoil 38 in tension. The aerofoil 38 is coupled with the spigot 42 in such a way that the portion of the centrifugal force loads acting on the aerofoil in tension are less than a design tensile strength limit of the aerofoil 38. This causes the maximum tensile or compressive stress within the aerofoil 38 to be reduced compared to an aerofoil loaded either entirely in compression or entirely in tension. As a result, the present aerofoil 38 may have less design restrictions, for example, the aerofoil 38 may be thinner or take a different shape that other aerofoils may not achieve due to their requirement to take all force loads in compression or to take all force loads in tension. In some embodiments, the blade 26 includes through thickness reinforcement features such as, for example, z-pins or direct insertion pins. The reinforcement features may improve the through-thickness tensile and shear capability relative to a 2D woven structure.

The retainer wall 66 is spaced apart radially from the radial inner end 70 and the radially outer end 72 of the outer wall 64 by a predetermined distance. The radial predetermined location of the retainer wall 66 and the outer end 48 of the spigot are selected to include a first predetermined portion of the outer wall 64 in the compression region 74 and to include a second predetermined portion of the outer wall 64 in the tension region 76. In the illustrative embodiment, the predetermined location of the retainer wall 66 and the outer end 48 of the spigot are selected to cause a first portion of the mass of the outer wall 64 to be located in the compression region 74 and a second portion of the mass of the outer wall 64 to be located in the tension region 76.

In some embodiments, a radial length of the tension region 76 is about equal to a radial length of the compression region 74. In some embodiments, the radial length of the tension region 76 is greater than the radial length of the compression region 74. In some embodiments, the radial length of the tension region 76 is less than the radial length of the compression region 74. In some embodiments, the radial length of the tension region 76 is between about 10 percent and 70 percent of the entire radial length of the outer wall 64. In some embodiments, the radial length of the tension region 76 is between about 10 percent and 50 percent of the entire radial length of the outer wall 64. In some embodiments, the radial length of the tension region 76 is between about 10 percent and 40 percent of the entire radial length of the outer wall 64. In some embodiments, the radial length of the tension region 76 is between about 20 percent and 45 percent of the entire radial length of the outer wall 64. In some embodiments, the radial length of the tension region 76 is between about 20 percent and 50 percent of the entire radial length of the outer wall 64.

In some embodiments, the radial length of the tension region 76 is about 10 percent of the entire radial length of the outer wall 64. In some embodiments, the radial length of the tension region 76 is about 20 percent of the entire radial length of the outer wall 64. In some embodiments, the radial length of the tension region 76 is about 25 percent of the entire radial length of the outer wall 64. In some embodiments, the radial length of the tension region 76 is about 30 percent of the entire radial length of the outer wall 64. In some embodiments, the radial length of the tension region 76 is about 40 percent of the entire radial length of the outer wall 64. In some embodiments, the radial length of the tension region 76 is equal to about 50 percent of the entire radial length of the outer wall 64.

Illustratively, the retainer wall 66 is spaced apart radially from the radial outermost end 72 of the outer wall 64 by a predetermined distance to cause a first portion of radial force loads acting on the outer wall 64 during rotation of the turbine blade 26 to be applied as tension to the tension region 76 of the outer wall. The predetermined distance further causes a second portion of the radial force loads acting on the outer wall 64 to be applied as compression to the compression region 74 of the outer wall 64 so that a magnitude of the radial force loads applied as compression during use of the turbine blade 26 to the outer wall 64 is reduced. In other embodiments, the size and location of the compression region 74 and the tension region 76 are selected by other coupling methods between the aerofoil 38 and the spigot 42. For example, in some embodiments, the blade 26 includes rockers or a rocker system to couple the aerofoil 38 with the spigot 42 as shown in FIGS. 6-9 in conjunction with or instead of the retainer wall 66.

The outer wall 64 of the aerofoil 38 is coupled with the spigot 42 such that the tension region 76 extends radially beyond the outer end 48 of the spigot 42 and is cantilevered from the outer end 48 of the spigot 42. That is, the outer wall 64 has a free end. A compression force is not applied to the free end. In contrast, some mounting devices use a support strut (with or without a clamping cap) that extends beyond the aerofoil or aerofoil segment and engage a radial outermost end of the aerofoil or aerofoil segment to apply a clamping compression force to the entire aerofoil or aerofoil segment.

The retainer wall 66 is formed to define a hole 78 that extends radially through the retainer wall 66 as shown in FIG. 5. The hole 78 is aligned axially and circumferentially with the outlet 60 of the passage 58. Illustratively, a fastener 80 extends through the hole into the outlet 60 of the spigot to couple the aerofoil 38 with the spigot 42.

The blade 26 further includes a fastener 80 and a sole plate 82 as shown in FIGS. 4 and 5. The fastener 80 extends radially through the sole plate 82 and the retainer wall 66 and into the outer end 48 of the spigot 42 to couple the aerofoil 38 with the root 36. The sole plate 82 is located between the fastener 80 and the retainer wall 66 to distribute forces along the retainer wall 66. The sole plate 82 is formed to define a hole 85 that extends radially through the sole plate 82. The fastener 80 includes a bolt, pin, or other retainer and may include threads, retainer clips, etc. to couple the aerofoil 38 with the spigot 42. The sole plate 82 may be a compliant or non-compliant (rigid) component.

The fastener 80 is formed to include a passage 84 that extends radially through the fastener 80 as shown in FIG. 5. The passage 84 is in fluid communication with the passage 58 to conduct the cooling fluid into an outer cavity of the interior region 68. The passages 52, 58, and 84 cooperate to form the passageway 50.

The blade 26 further includes a cap 88 coupled to the outer wall 64 at the radial outer end 72 as shown in FIG. 5. The cap 88 closes an opening into the interior region 68. The cap 88 is formed to include a plurality of radial holes 90 in the illustrative embodiment to provide fluid communication between the interior region 68 and environment outside of and around the blade 26 to allow the cooling fluid in the interior region 68 to exit the blade 26. The holes 90 may be angled through the cap 88 to offer aerodynamic and/or heat pick up improvement. In some embodiments, the holes 90 are angled off-radial. In some embodiments, the holes 90 are angled toward a trailing edge of the blade.

The cap 88 is illustratively made of ceramic matrix composite material. The cap 88 is coupled via brazing, bonding, or any other suitable alternative to the outer wall 64 after the fastener 80 is installed in the spigot 42. The cap 88 is spaced apart radially from the tip of the aerofoil 38 to cause the aerofoil 38 to provide squealer tips 92.

Figure 6:
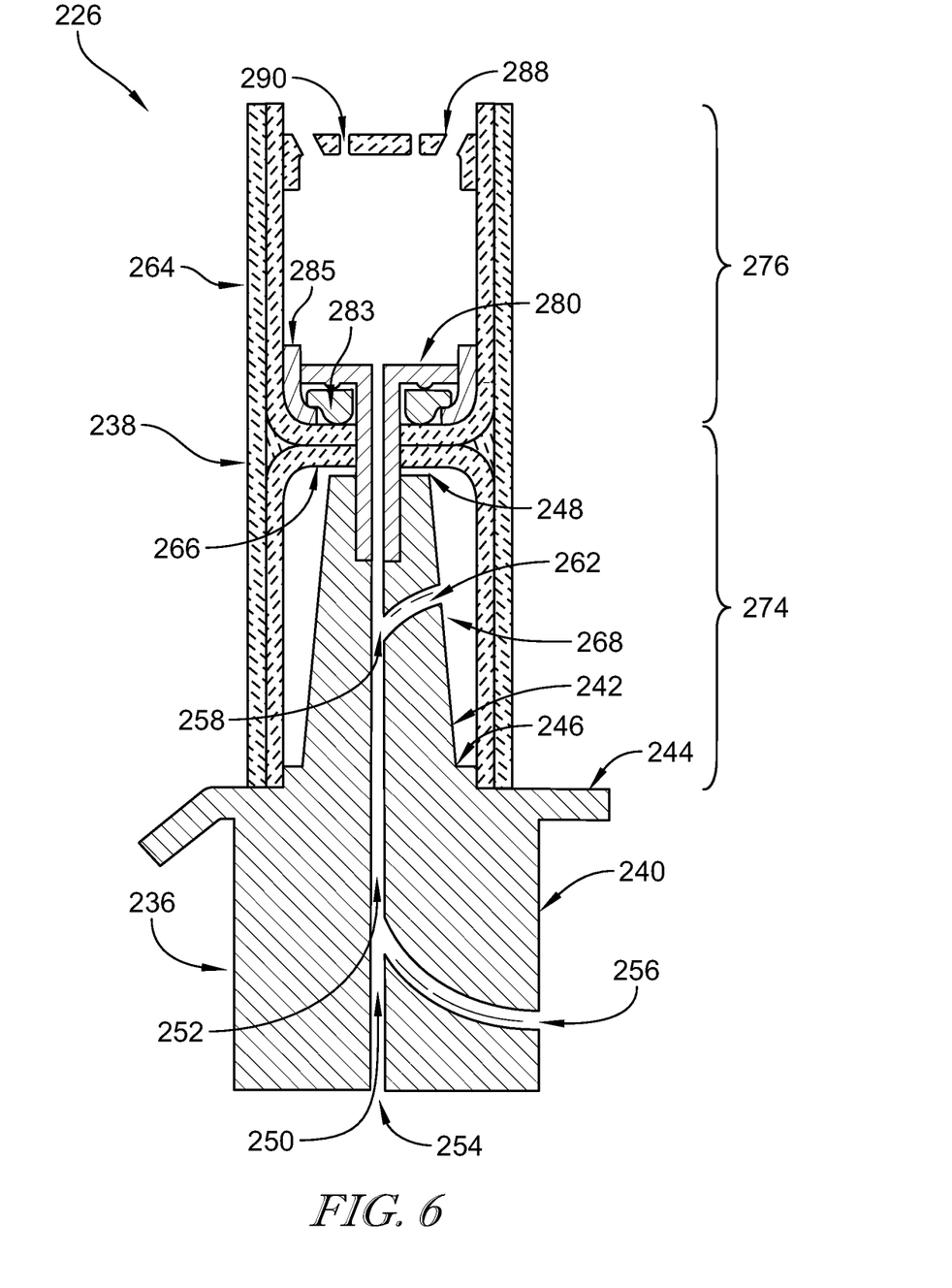
FIG. 6 is a diagrammatic and section view of another embodiment of a turbine blade in accordance with the present disclosure showing that the turbine blade includes a metallic root, a ceramic matrix composite aerofoil, and a rocker system that includes a rocker adapted to apply forces to the aerofoil and a mass adapted to adjust the force of the rocker during use of the turbine blade.
Figure 7:
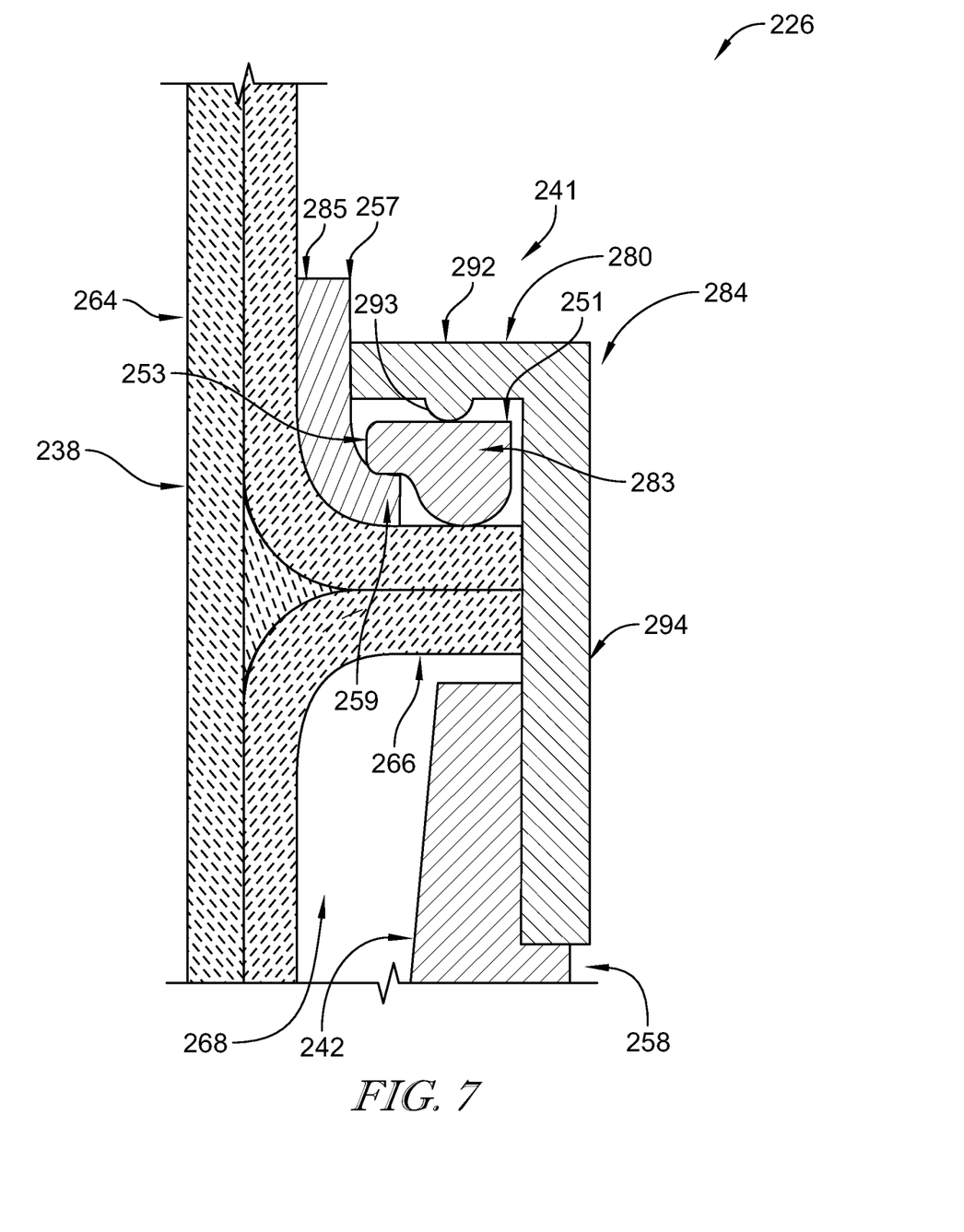
FIG. 7 is an enlarged view of FIG. 6 showing that the rocker is located radially between a fastener of the turbine blade and a retainer wall of the aerofoil and that a portion of the mass is located radially between the rocker and the retainer wall.

Another embodiment of a turbine blade 226 in accordance with the present disclosure is shown in FIGS. 6 and 7. The turbine blade 226 is substantially similar to the turbine blade 26 shown in FIGS. 1-5 and described herein. Accordingly, similar reference numbers in the 200 series indicate features that are common between the turbine blade 26 and the turbine blade 226. The description of the turbine blade 26 is incorporated by reference to apply to the turbine blade 226, except in instances when it conflicts with the specific description and the drawings of the turbine blade 226.

The blade 226 includes a root 236, an aerofoil 238, and a rocker system 241 as shown in FIG. 6. The root 236 includes an attachment feature 240 and a spigot 242. The attachment feature 240 is shaped to be received in a blade-receiver slot of a disc. The spigot 242 extends radially away from the attachment feature 240 and is coupled with the aerofoil 238 to couple the aerofoil 238 with the root 236 for movement with the root 236. The root 236 further includes a platform 244 in the illustrative embodiment. The platform 244 is coupled with the attachment feature 240 and is located radially outward of the attachment feature 240.

The root 236 is formed to include a cooling passageway 250 that extends radially through the root 236 to conduct cooling fluid through the blade 226 as shown in FIG. 6. The attachment feature 240 is formed to define a passage 252 that extends radially through the attachment feature. The passage 252 includes a first inlet 254 that opens into a radially inner surface of the attachment feature 240 and a second inlet 256 that opens into a side surface of the attachment feature 240.

The spigot 242 includes an inner end 246 and an outer end 248 that is spaced apart radially from the inner end 246 of the spigot 242 as shown in FIG. 6. The inner end 246 is coupled with the attachment feature 240 for movement therewith. The outer end 248 is cantilevered from the attachment feature 240. The spigot 242 tapers continuously from the inner end 246 to the outer end 248 in the illustrative embodiment. The spigot 242 includes a passage 258 that includes an outlet at the outer end 248 and an outlet 262 on the sidewall of the spigot 242. The passage 258 is in fluid communication with the passage 252.

The aerofoil 238 includes an outer wall 264 and a retainer wall 266 as shown in FIGS. 6 and 7. The outer wall 264 is arranged around the spigot 242. A radial inner end of the outer wall 264 is coupled with the attachment feature 240 and/or spigot 242 near inner end 246 via a pin, brazing, bonding, a clamping member, or any other suitable alternative. The outer wall 264 is formed to define an interior region 268 that receives the spigot 242. The retainer wall 266 is coupled with and extends away from the outer wall 264 into the interior region 268. The retainer wall 266 is coupled with the spigot 242 to couple the aerofoil 238 with the root 236.

The retainer wall 266 is coupled with the outer end 248 of the spigot 242 via rocker system 241 to define a compression region 274 of the outer wall 264 and a tension region 276 of the outer wall 264 as shown in FIG. 6. Force loads acting on the aerofoil 238 due to centrifugal forces during use of the blade 226 are applied to the compression region 274 in compression and applied to the tension region 276 in tension. The outer wall 264 of the aerofoil 238 is coupled with the spigot 242 such that the tension region 276 extends radially beyond the outer end 248 of the spigot 242 and is cantilevered from the outer end 248 of the spigot 242. The retainer wall 266 may be spaced apart from the outer end 248 of the spigot 242 during use of the turbine blade 226 as shown in FIG. 7.

The blade 226 further includes a cap 288 coupled to the outer wall 264 as shown in FIG. 6. The cap 288 closes an opening into the interior region 268 and includes holes 290.

The rocker system 241 includes a fastener 280, a rocker 283, and a mass 285 as shown in FIG. 6. In the illustrative embodiment, the rocker system 241 includes a plurality of rockers and a plurality of masses. The fastener 280 couples the aerofoil 238 with the spigot 242. The rocker 283 and the mass 285 cooperate to generate a radial inboard load which offsets a fixed proportion of the total centrifugal load that the root 236 reacts during use of the turbine blade 226.

The fastener 280 extends radially through the retainer wall 266 and into the outer end 248 of the spigot 242 to couple the aerofoil 238 with the root 236 as shown in FIG. 6. The fastener 280 may include a bolt, pin, or other retainer and may include threads, retainer clips, etc. to couple the aerofoil 238 with the spigot 242. The fastener 280 is formed to include a passage 284 that extends radially through the fastener 280. The passage 284 is in fluid communication with the passage 258 to conduct the cooling fluid into an outer cavity of the interior region 268 and/or to prevent ingestion of hot gas into the interior region 268. The passages 252, 258, and 284 cooperate to form the passageway 250.

The fastener 280 includes a head 292 and a shaft 294 that extends radially away from the head and into the spigot 242 as shown in FIG. 7. The head 292 includes a rounded protrusion 293 that is configured to engage the rocker 283.

The rocker 283 is located radially between the head 292 of the fastener 280 and the retainer wall 266 as shown in FIG. 7. The rocker 283 includes a body 251 and a lever arm 253 that extends away from the body 251. The body 251 includes a flat outer surface that engages the rounded protrusion 293 and a rounded inner surface (curvilinear) that engages the retainer wall 266. The body 251 is configured to rotate relative to the fastener 280 and the retainer wall 266.

A portion of the mass 285 is located radially between the lever arm 253 and the retainer wall 266 as shown in FIG. 7. The mass 285 is configured to be urged radially outward during rotation of the turbine blade 226 which applies an outward force to the lever arm 253 and causes the rocker 283 to be urged to rotate and apply an inward force to the retainer wall 266 that increases as the centrifugal force acting on the mass 285 increases. As such, the rocker 382 creates an inboard load which offsets a fixed proportion of total centrifugal load that the blade root attachment reacts. Illustratively, the mass 285 has a first end 257 and a second end 259 that curves away from the outer wall 264 and is located between the lever arm 253 and the retainer wall 266.

Figure 8:
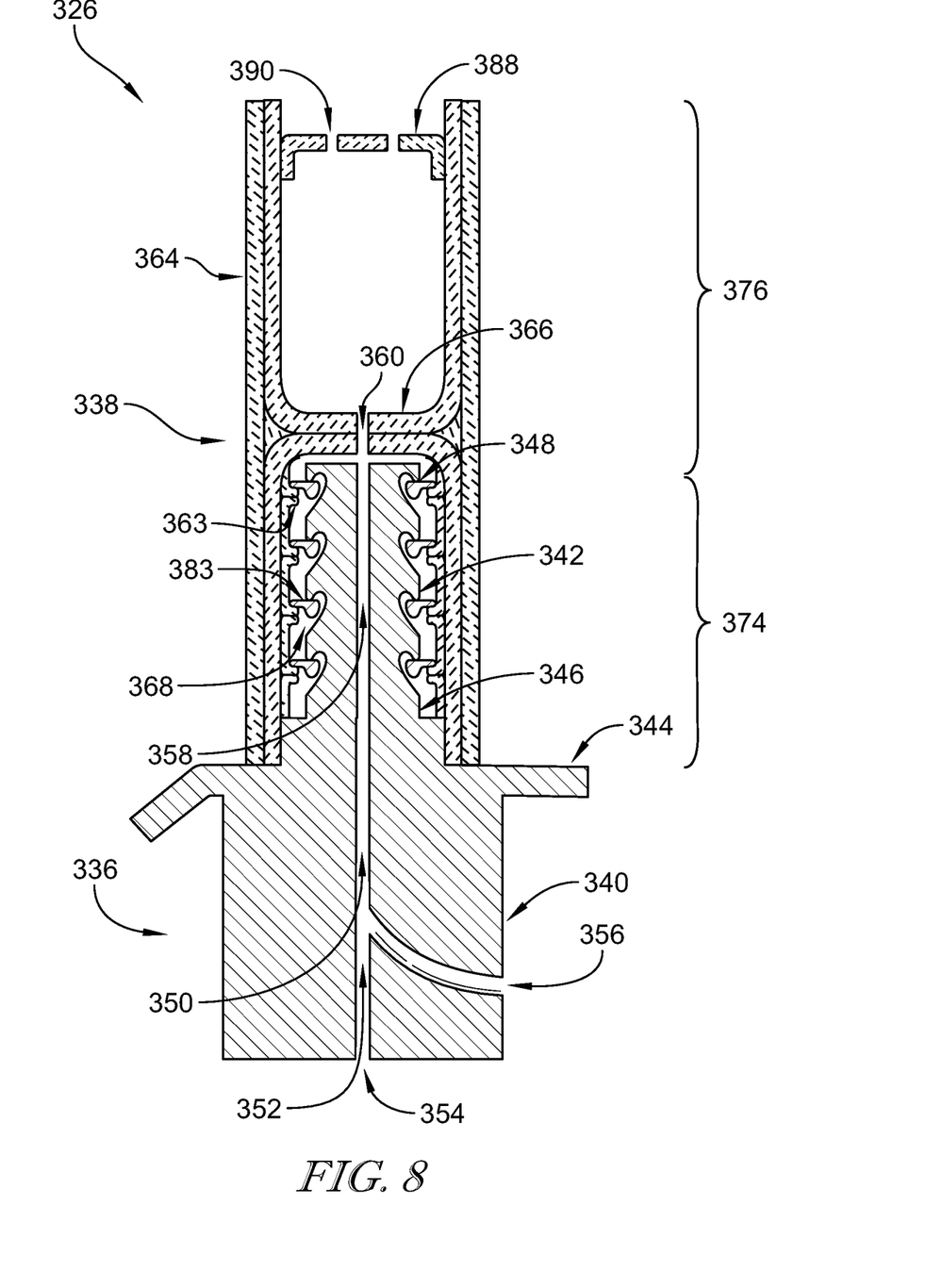
FIG. 8 is a diagrammatic and section view of another embodiment of a turbine blade in accordance with the present disclosure showing that the turbine blade includes a metallic root, a ceramic matrix composite aerofoil, and a rocker system that couples the ceramic matrix composite aerofoil with the metallic root and the rocker system includes a plurality of rockers located in a spigot of the root and engaged with the aerofoil.
Figure 9:
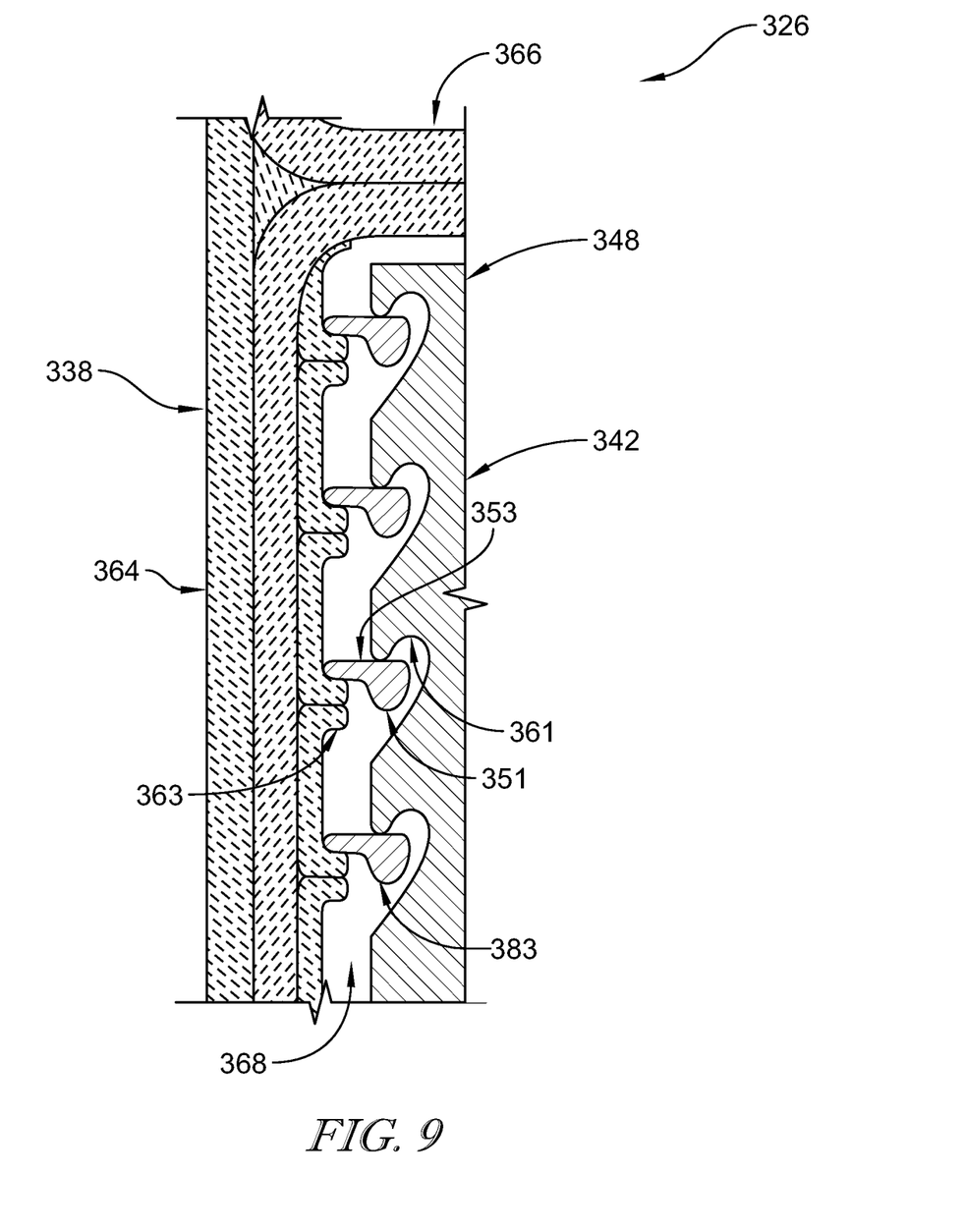
FIG. 9 is an enlarged view of FIG. 8 showing that the spigot included in the metallic root is formed to define recesses and the rockers are located in the recesses and extend outward and engage the aerofoil to couple the ceramic matrix composite aerofoil with the metallic root.

Another embodiment of a turbine blade 326 in accordance with the present disclosure is shown in FIGS. 8 and 9. The turbine blade 326 is substantially similar to the turbine blade 26 shown in FIGS. 1-5 and described herein. Accordingly, similar reference numbers in the 300 series indicate features that are common between the turbine blade 26 and the turbine blade 326. The description of the turbine blade 26 is incorporated by reference to apply to the turbine blade 326, except in instances when it conflicts with the specific description and the drawings of the turbine blade 326.

The blade 326 includes a root 336, an aerofoil 338, and rockers 383 as shown in FIGS. 8 and 9. The root 336 includes an attachment feature 340 and a spigot 342. The attachment feature 340 is shaped to be received in a blade-receiver slot of a disc. The spigot 342 extends radially away from the attachment feature 340 and is coupled with the aerofoil 338 to couple the aerofoil 338 with the root 336 for movement with the root 336. The root 336 further includes a platform 344 in the illustrative embodiment. The platform 344 is coupled with the attachment feature 340 and is located radially outward of the attachment feature 340.

The root 336 is formed to include a cooling passageway 350 that extends radially through the root 336 to conduct cooling fluid through the blade 326 as shown in FIG. 8. The attachment feature 340 is formed to define a passage 352 that extends radially through the attachment feature 340. The passage 352 includes a first inlet 354 that opens into a radially inner surface of the attachment feature 340 and a second inlet 356 that opens into a side surface of the attachment feature 340.

The spigot 342 includes an inner end 346 and an outer end 348 that is spaced apart radially from the inner end 346 of the spigot 342 as shown in FIG. 8. The inner end 346 is coupled with the attachment feature 340 for movement therewith. The outer end 348 is cantilevered from the attachment feature 340. The spigot 342 includes a passage 358 that includes an outlet 360 at the outer end 348 of the spigot 342. The passage 258 is in fluid communication with the passage 252. The spigot 342 is formed to include a plurality of recesses 361 that extend into the spigot 342 and are shaped to receive a portion of a corresponding rocker 383.

The aerofoil 338 includes an outer wall 364 and a retainer wall 366 as shown in FIGS. 8 and 9. The outer wall 364 is arranged around the spigot 342. A radial inner end of the outer wall 364 is coupled with the attachment feature 340 and/or spigot 342 near inner end 346 via a pin, brazing, bonding, a clamping member, or any other suitable alternative. The outer wall 364 is formed to define an interior region 368 that receives the spigot 342. The retainer wall 366 is coupled with and extends away from the outer wall 364 into the interior region 368.

The retainer wall 366 is located radially outward of the outer end 248 of the spigot 342. The retainer wall 366 is formed to include a hole that is in fluid communication with the passage 358 defined in the spigot 342. In other embodiments, the retainer wall 366 is omitted. The aerofoil 338 further includes a plurality of tabs 363 that extend inward away from the outer wall 364 into the interior region 368 as shown in FIG. 9. The tabs 363 are spaced apart radially from one another. The retainer wall 366 may be spaced apart from the outer end 348 of the spigot 342 during use of the turbine blade 326 as shown in FIG. 9.

The blade 326 further includes a cap 388 coupled to the outer wall 364 as shown in FIG. 8. The cap 388 closes an opening into the interior region 368 and includes holes 390.

The rockers 383 are configured to generate a radial inboard load which offsets a fixed proportion of the total centrifugal load that the root 336 reacts. The rockers 383 are an integral rocker and mass component. Each rocker 383 includes a body 351 that is located partway into one of the recesses 361 formed in the spigot 342 and a lever arm 353 that extends away from the body 351 and engages one of the tabs 363 of the aerofoil 338 to block radial movement of the aerofoil 338 relative to the spigot 342. The body 351 has a curvilinear shape as shown in FIG. 9.

During rotation of the turbine blade 326 about the axis, the aerofoil 338 is urged radially outward which transmits a force from the tabs 363 to the lever arms 353 of the rockers 383. The lever arms 353 transmit the force to the bodies 351 of the rockers 383 which are retained by the spigot 342 such that the rockers 383 generate an inboard load which offsets a portion of the centrifugal load acting on the root 336. The rockers 383 may block radial movement of the aerofoil 338 relative to the spigot 342. The rockers 383 may rotate relative to the spigot 342 by a limited amount to vary the location of the force applied to the spigot 342 from the aerofoil 338. The plurality of rockers minimize the load transmitted through any individual tab feature 363

During assembly, the rockers 383 may be inserted into the recesses 361. The aerofoil 338 is translated radially relative to the root 336 such that the spigot 342 and rockers 383 are located in the interior region 368. The aerofoil 338 is then rotated slightly about an axis that extends through the inner and outer ends 346, 348 of the spigot 342 relative to the spigot 342 so that the lever arms 353 engage the tabs 363. The aerofoil 338 is then blocked from rotation relative to the spigot 342 with an anti-rotation feature.

According to the present disclosure, a method and apparatus for minimizing stress in a ceramic matrix composite (CMC) turbine blade 26 is provided. A turbine blade that comprises ceramic matrix composite material may be subject to significant stress due to centrifugal loading. The centrifugal loading may be of the order of 50,000 g. To allow sufficient cross section material in the root and shank region of some turbine blades comprising ceramic matrix composite material, the material remaining in the corresponding disc post may be insufficient to prevent 'unzipping' of the disc and blades in the event of blade loss.

The present disclosure provides a single crystal metallic fir tree or dove tail root, shank, and inner spar on which the hollow ceramic matrix composite aerofoil 38 is mounted. By mounting the aerofoil 38 through a septum 42 part way up the blade 26, the centrifugal forces induced stress in the ceramic matrix composite is reduced to a manageable level without the geometrical constraints associated with mounting a ceramic matrix composite blade directly in the disc 24.

Ceramic materials may be stronger in compression than in tension. The present disclosure and its variants reduce the proportion of the material that is in tension by placing the fixing to the conventional metallic components further outboard relative to the axis of rotation. This allows for some of the aerofoil to be in tension to minimize compression forces in the aerofoil 38. As such, the centrifugal forces acting on the aerofoil 38 are distributed between tension and compression regions of the aerofoil 38 so that the aerofoil 38 need not be designed to withstand all of the centrifugal forces in compression or to withstand all of the centrifugal forces in tension.

Ceramic matrix composite blades based on composite construction employed in polymer composite fan blades may include unidirectional tapes of prepreg placed at appropriate orientations to withstand centrifugal forces and aerodynamic loading. The relatively low strength of ceramic matrix composite materials may be an issue as the cross section in the ceramic matrix composite root area to withstand the loads induced may be excessive, leading to compromises in the cross sectional area remaining available for the disc posts.

The inboard end of the hollow ceramic matrix composite aerofoil 38 is axially and circumferentially located on a spigot 42 which is part of the metallic root 36 (which may be single crystal casting). An optional compliant layer or coating such as the sole plate 82 may be applied in this region to accommodate load transfer and reduce chemical interaction with the ceramic matrix composite material and metallic materials.

In the illustrative embodiment, the centrifugal forces load imparted by the hollow ceramic matrix composite aerofoil 38 is transferred to a fastener or fasteners 80 by a metallic sole plate 82 which may have a compliant layer or coating applied for more even load transfer and to reduce chemical interaction between the ceramic matrix composite material and the metallic components.

The fastener 80 may be a bolt or alternatively a Belville type fastener or a snap ring. The latter could be non-circular to allow a larger cross section. To control the temperature of the materials (particularly the metallic parts), a small cooling flow is provisioned in some embodiments via a cast or machined channel in the attachment feature 40 and shank 42 and a hollow fastener 80. A closure plate 88 may be bonded into the tip region of the blade to facilitate a 'squealer' style geometry. Bonding of the closure plate 88 and the aerofoil outer wall 64 may be done via brazing or another mechanism.

The present disclosure may manage centrifugal forces loading in the root of a turbine blade and load transfer into the rim of the disc. Making the aerofoil 38 hollow may reduce its mass, reducing the load transferred from the aerofoil to the metallic root. By mounting the aerofoil 38 through a septum 42 part way up the blade 26, the centrifugal forces induced stress in the ceramic matrix composite aerofoil 38 may be reduced to a manageable level without the geometrical constraints associated with mounting a ceramic matrix composite blade directly in the disc 24. As such, the present disclosure uses the combination of metallic and ceramic matrix composite attributes.

Metallic components may be high strength and high density, but less temperature capable than ceramic or composite materials. Ceramic matrix composite and/or composite materials may be high temperature capable and low density, but may have low strength when compared with metallic components. Ceramic matrix composite material may be stronger in compression than tension. In other words, ceramic matrix composite material may have a higher compressive strength as compared to tensile strength.

The margin in self-load carrying capability of the metallic structure is used to off-load some of the centrifugal forces load generated by the ceramic matrix composite in the illustrative embodiments, given the low mass of the ceramic matrix composite (low density and thin-wall hollow). Metallic parts of the turbine blade may be protected from flow path gas temperatures in the turbine because they are located within the ceramic matrix composite aerofoil.

Other methods of attaching the hollow ceramic matrix composite blade to the metallic spar may be possible. In one embodiment, the centrifugal forces driven stresses at the root of a ceramic matrix composite blade are reduced, which may be limiting given the low specific strength of the material.

In such an embodiment, a mass 285 and rocker 283 arrangement may be used to generate an inboard load, applied near the outboard end of a hollow aerofoil, which offsets a fixed proportion of the total centrifugal forces load that the blade root attachment must react. This embodiment may generate a load that is insensitive to mismatches in growths between the metallic and ceramic matrix composite elements of the assembly (due to coefficient of thermal expansion and elastic moduli differences and from dimensional tolerances) and may be a constant proportion of the total centrifugal forces load, ie is effective at all operating speeds.

Uniform sharing of reaction loads between multiple attachment features between ceramic matrix composite and metallic parts may be challenging with any kind of rigid mounting. Effective spring-like clamping features may also be difficult to achieve over a range of loading conditions, and over long lifetimes at high temperature (eg creep relaxation). In contrast, mismatches in displacements of the embodiments shown in FIGS. 6-9 are accommodated by articulation of the rocker, effectively delivering a load-controlled force to the ceramic matrix composite aerofoil. The magnitude of off-load and accommodation of displacement mismatches can be tuned by the mass and kinematics of the rocker arrangement.

In the illustrative embodiment, the rocker 283 is located near the tip of the hollow blade 238 and has a main retention feature near the hub. The post, lever 283 (rocker) and mass 285 are metallic, the aerofoil 238 is ceramic matrix composite. The mass 285 is located and slides on the outer diameter of the post. The rockers 283 are straight sections and are segmented (eg one along pressure side, one along suction side). Rocker geometry may be tuned to provide some mechanical advantage to the load imparted onto the ceramic matrix composite vs the centrifugal forces load from the mass. Under centrifugal forces load, the mass 285 reacts a load through the rocker 283, which rocks on the post, transmitting an inboard load on the septum of the hollow ceramic matrix composite aerofoil.

In another embodiment, a derivative of the 'root stress off-load' concept is used and may offer a more uniformly distributed load by the action of multiple mass and rockers. This may allow a large proportion of the total centrifugal forces load to be reacted through these features and only a small load for the attachment at the root.

In the illustrative embodiment, the mass and rocker is shown as a single piece 383, captive in a slotted metallic post 342 that acts as a fulcrum for the rockers 383. The rocker profile is such that more mass is on one side than the other, the imbalance under centrifugal forces loading providing the inboard load which is reacted onto the ceramic matrix composite aerofoil via an internal rib feature. This embodiment may tend toward an ideal (from a stress in the ceramic matrix composite aerofoil perspective) of a uniformly distributed traction along the radial height of the blade. This may minimize any in-plane stresses developed.

The relatively large contact area between aerofoil 338 and rockers 383 may add damping to the assembly. The internal ribs may aid hoop strength of blade (burst capability). The post, lever (rocker) and mass are metallic and the aerofoil is ceramic matrix composite in the shown embodiment. The rocker/mass 383 is located and slides on the outer diameter of the post. The rockers are straight sections and segmented (eg one along pressure side, one along suction side). Under centrifugal forces load, the mass reacts a load through the rocker, which rocks on the post, transmitting an inboard load on the septum of the hollow ceramic matrix composite aerofoil. Nominally, the sum of these loads could balance the total centrifugal forces load from the ceramic matrix composite aerofoil. A retention feature to the disc grounds the aerofoil to control the position of the aerofoil and react any remaining load not balanced by the rockers/masses.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade for a gas turbine engine, the turbine blade comprising
    a metallic root that includes an attachment feature adapted to couple the turbine blade with a disc for rotation about an axis and a spigot that extends radially away from the attachment feature relative to the axis between a first end and a second end of the spigot,
    a ceramic matrix composite aerofoil adapted to interact with gases during use of the turbine blade, the ceramic matrix composite aerofoil includes an outer wall that defines an interior region that receives the spigot of the metallic root and a retainer wall that extends away from the outer wall into the interior region, and the retainer wall being coupled with the second end of the spigot to define a compression region of the outer wall located radially between a radial innermost end of the outer wall and the retainer wall and a tension region located radially between the retainer wall and a radial outermost end of the outer wall that defines a tip of the turbine blade such that the tension region extends radially beyond the second end of the spigot and is cantilevered from the second end of the spigot,
    wherein the retainer wall is spaced apart radially from the radial outermost end of the outer wall by a predetermined distance to cause a first portion of radial force loads acting on the outer wall during rotation of the turbine blade to be applied as tension to the tension region of the outer wall and a second portion of the radial force loads acting on the outer wall to be applied as compression to the compression region of the outer wall so that a magnitude of the radial force loads applied as compression during use of the turbine blade to the outer wall is reduced,
    wherein the ceramic matrix composite aerofoil includes a cap coupled with the outer wall and located radially outward and spaced apart from the retainer wall.

2. The turbine blade of claim 1, further comprising a fastener that extends radially through the retainer wall and into the second end of the spigot to couple the retainer wall with the spigot for movement therewith.

3. The turbine blade of claim 2, wherein the metallic root is formed to define a first cooling passage that extends radially through the attachment feature and the spigot, the fastener is formed to define a second cooling passage that extends radially through the fastener, and the first cooling passage is in fluid communication with the second cooling passage to allow cooling fluid to flow through the metallic root and the fastener into the interior region.

4. The turbine blade of claim 1, wherein the cap is formed to include a through hole that extends radially through the cap to allow fluid located in the interior region to exit the turbine blade through the cap and the through hole is angled toward a trailing edge of the turbine blade.

5. The turbine blade of claim 1, wherein the cap is spaced apart radially inwardly from the radial outermost end of the outer wall of the ceramic matrix composite aerofoil.

6. The turbine blade of claim 1, further comprising a rocker system that includes a fastener, a rocker, and a mass, the fastener extends radially through the retainer wall and into the second end of the spigot, the rocker is located radially between the fastener and the retainer wall, and at least a portion of the mass is located radially between the rocker and the retainer wall and configured to apply a radially outward force to the rocker during rotation of the turbine blade about the axis.

7. The turbine blade of claim 1, wherein the spigot is formed to define a recess that extends into the spigot, the turbine blade further comprises a rocker located in the recess of the spigot, and the rocker engages the ceramic matrix composite aerofoil to apply a radial inward load to the aerofoil during use of the turbine blade.

8. A turbine blade for a gas turbine engine, the turbine blade comprising
    a metallic root that includes an attachment feature adapted to couple the turbine blade with a disc for rotation about an axis and a spigot that extends radially away from the attachment feature relative to the axis between a first end and a second end of the spigot,
    a ceramic matrix composite aerofoil adapted to interact with gases during use of the turbine blade, the ceramic matrix composite aerofoil includes an outer wall that defines an interior region that receives the spigot of the metallic root and a retainer wall that extends away from the outer wall into the interior region, and the retainer wall being coupled with the second end of the spigot to define a compression region of the outer wall located radially between a radial innermost end of the outer wall and the retainer wall and a tension region located radially between the retainer wall and a radial outermost end of the outer wall that defines a tip of the turbine blade such that the tension region extends radially beyond the second end of the spigot and is cantilevered from the second end of the spigot, wherein the retainer wall is spaced apart radially from the radial outermost end of the outer wall by a predetermined distance to cause a first portion of radial force loads acting on the outer wall during rotation of the turbine blade to be applied as tension to the tension region of the outer wall and a second portion of the radial force loads acting on the outer wall to be applied as compression to the compression region of the outer wall so that a magnitude of the radial force loads applied as compression during use of the turbine blade to the outer wall is reduced, wherein the spigot is tapered continuously from the first end to the second end.

9. A turbine blade for a gas turbine engine, the turbine blade comprising a root that includes an attachment feature and a spigot that extends radially away from the attachment feature relative to an axis between a first end and a second end of the spigot, and an aerofoil arranged around the spigot to define an interior region that receives the spigot and the aerofoil being coupled with the spigot such that a portion of the aerofoil extends radially outward away from the second end of the spigot and is cantilevered from the second end of the spigot, wherein the aerofoil includes a radially extending outer wall that defines the interior region and a retainer wall that extends away from the outer wall into the interior region and the turbine blade further comprises a rocker system that includes a fastener, a rocker, and a mass, the fastener extends radially through the retainer wall and into the second end of the spigot, the rocker is located radially between the fastener and the retainer wall, and at least a portion of the mass is located radially between the rocker and the retainer wall.

10. The turbine blade of claim 9, wherein the fastener is coupled with the spigot to couple the retainer wall with the spigot for movement with the spigot.

11. The turbine blade of claim 9, wherein the attachment feature, the spigot, and the fastener are formed to define fluidly connected passages that are configured to conduct fluid through the root and into the interior region of the aerofoil.

12. The turbine blade of claim 9, wherein the aerofoil has a radial inner end located adjacent the attachment feature of the root and a radial outer end spaced apart radially from the radial inner end and the turbine blade further comprises a cap received in the interior region and coupled to an interior surface of the aerofoil at the radial outer end of the aerofoil.

13. The turbine blade of claim 12, wherein the cap is formed to include a cooling hole that extends radially through the cap and provides fluid communication between the interior region and an environment outside of and around the turbine blade.

14. The turbine blade of claim 9, wherein the spigot is formed to define a recess that extends circumferentially into the spigot, the turbine blade further comprises the rocker located in the recess, and the rocker engages the aerofoil.

15. The turbine blade of claim 14, wherein the rocker includes a body located in the recess and having a curvilinear surface that engages the spigot in the recess and a lever arm that extends away from the body and engages the aerofoil.

16. The turbine blade of claim 9, wherein the spigot tapers continuously from the first end to the second end of the spigot.

17. The turbine blade of claim 9, wherein the aerofoil extends continuously between a radial innermost end of the aerofoil located adjacent the attachment feature of the root and a radial outermost end that defines a tip of the turbine blade.

* * * * *